United States Patent

[11] 3,600,589

[72] Inventor Charles C. Hanson
Rochester, Minn.

[21] Appl. No. 768,706
[22] Filed Oct. 18, 1968
[45] Patented Aug. 17, 1971

[73] Assignee International Business Machines Corporation
Armonk, N.Y.

[54] LOGARITHMIC SENSE AMPLIFIER HAVING MEANS FOR ESTABLISHING A PREDETERMINED OUTPUT VOLTAGE LEVEL WHEN THE INPUT SIGNAL IS AT A MAXIMUM
12 Claims, 8 Drawing Figs.

[52] U.S. Cl. .......... 250/214, 307/311, 330/110
[51] Int. Cl. .......... H01j 39/12, H03k 3/42, H03f 1/36
[50] Field of Search .......... 250/214, 219 I; 307/235, 311; 330/110

[56] References Cited

UNITED STATES PATENTS

| | | | |
|---|---|---|---|
| 3,517,199 | 6/1970 | Cochran | 250/214 |
| 3,191,124 | 6/1965 | Brown | 307/235 X |
| 2,833,937 | 5/1958 | Cox | 250/214 |
| 3,302,034 | 1/1967 | Nowell | 307/235 |
| 3,321,576 | 5/1967 | Linder et al. | 307/235 |
| 3,387,222 | 6/1968 | Hellwarth et al. | 307/235 |
| 3,398,373 | 8/1968 | Caswell | 307/235 |
| 3,428,814 | 2/1969 | Doonan | 250/214 |

OTHER REFERENCES

Kline, N. D., " Mark Sensing By Reflectance Ratio Determination" , IBM Technical Disclosure Bulletin, Vol. 8 No. 9, Feb. 1966, pages 1294— 1295

*Primary Examiner*—James W. Lawrence
*Assistant Examiner*—T. N. Grigsby
*Attorney*—Schroeder, Siegfried & Ryan

ABSTRACT: A logarithmic sense amplifier particularly adapted for use in contrast measurement for character or mark reading systems. The amplifier includes an input circuit combining a photodevice sensor consisting of a diode having a logarithmic characteristic for range compression and a compatible differential amplifier having a feedback network which includes an output voltage comparator and a peak voltage storage device to feedback a signal to the input of the amplifier so that steady state input signals are balanced out in the output such that only incremental input changes evidencing the presence of a mark will be present in the output of the differential amplifier of the amplifying system.

INVENTOR.

BY CHARLES C. HANSON

Schroeder, Siegfried & Ryan

ATTORNEYS

LOGARITHMIC SENSE AMPLIFIER HAVING MEANS FOR ESTABLISHING A PREDETERMINED OUTPUT VOLTAGE LEVEL WHEN THE INPUT SIGNAL IS AT A MAXIMUM

This invention relates to logarithmic sense amplifying circuits, more particularly to an amplifying circuit of this type having range compression particularly adapted for use in contrast measurement, such as in a photosense amplifier.

BACKGROUND OF THE INVENTION

Amplifying equipment associated with light sensitive devices and amplifying equipment with compression circuits are known and in use. In general, photodevice sensors as measurement or control apparatus employ amplifying equipment merely to increase signal output levels and the resultant signals are directly proportional to the magnitude of voltage from the sensor. Compression circuits normally find application in connection with audio amplification and are principally directed to noise elimination and speed of response of the equipment. These are generally found in the form of gain control or feedback circuit in the amplifying equipment.

SUMMARY OF THE INVENTION

The logarithmic sense amplifier of the present invention is adapted to be connected to and controlled from a condition responsive means having variable current output characteristics the ratio of which current under varying conditions it is desired to detect and amplify. It is shown herein as a photosense amplifier circuit. In the area of contrast measurement utilizing light sensitive devices and in particular in character and mark recognition circuits, the output from a photosense amplifier should be responsive only to the presence or absence of a mark as seen by reading equipment to be compatible with associated equipment. In accord with the present invention, a photosense amplifier circuit is provided which combines the output of a light sensitive device with a voltage responsive current conducting device having the characteristics of an ideal diode to provide a voltage input to a differential amplifier with the feedback network which includes an output voltage comparator and a peak voltage storage device to feed back a signal to the input of the amplifier sufficient to balance out steady state input signals from the photo device sensor and permit the amplifier to respond only to voltage changes at the photodevice sensor. This, for character recognition purposes, the output signal will consist of a pulse output corresponding to the change in voltage at the photodevice sensor represented by the presence of a character or mark and, depending upon the condition of energization of the circuit components, these output signals may be of opposite sense. The range compression in the measuring circuit is detected in the amplifier to permit an output voltage magnitude corresponding to the change in voltage at the photodevice sensor such that large voltage swings are not required to give a large range of compression.

It is, therefore, the principal object of this invention to provide an improved logarithmic sense amplifier with range compression.

Another object of the present invention is to provide an amplifier with range compression which includes a feedback network which will cause the amplifier to see and amplify only the incremental swing in voltage appearing at the photodevice sensor.

A still further object of this invention is to provide an improved logarithmic sense amplifier with range compression in which a precision amplifier is not required and in which a conventional silicon transistor may be employed to give output characteristics in the measuring circuit with the photodevice sensor simulating an ideal diode.

These and other objects of this invention will become apparent from a reading of the attached description together with the drawings, wherein:

DESCRIPTION OF THE PREFERRED EMBODIMENT

My improved logarithmic sense amplifier utilizes a unidirectional voltage responsive current conducting device having logarithmic characteristics to obtain range compression. In contrast measurements such as from a light sensitive device, generally linear characteristics are obtained with changes in incident light thereon. Thus, in my improved current ratio amplifier which is shown herein as a photosense amplifier, the light sensitive device will have a current output which is general linear related to the light incident upon the device and a zero output current with the absence of incident light. In contrast measurement, however, and in particular in mark identification, a variety of light levels are encountered which makes it necessary to isolate only that change which takes place between the presence or absence of a mark on a sheet being read as a desirable output signal. Thus, the improved system, as will be hereinafter identified, utilizes relatively standard components to effect a compression of input voltage swings and to produce a usable level of voltage signal output from relatively small voltage changes with mark recognition to be compatible with associated equipment in character recognition systems.

Figure 1:
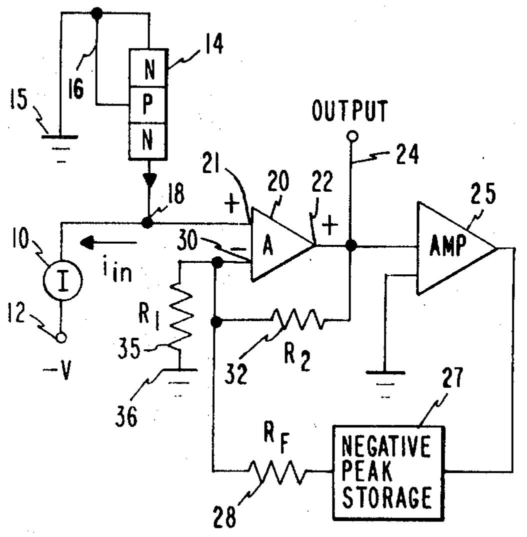
FIG. 1 is a block diagram of the improved logarithmic sense amplifying circuit.

In the block diagram of FIG. 1, a light sensitive device is indicated generally at 10 as connected through a B− or negative polarity direct current source of power, indicated at 12, and in series circuit with a photodevice sensor disclosed herein as a NPN silicon transistor, indicated at 14, whose collector is grounded as at 15. A short circuit conductor 16 connects the collector and base of the transistor 14 such that the transistor will take on the characteristics of a PN diode and approach the logarithmic characteristics of an ideal PN diode. It is described herein as a voltage reference device for the reason to be hereinafter noted. The midpoint 18 of the measuring network common to the emitter and one side of the light sensitive device 10 provides the output tap or signal source leading to the plus side 21 of a differential amplifier, indicated in block at 20. The output tap or circuit, indicated by the conductor 22, for the differential amplifier, provides a positive polarity signal output which represents contrast or change in light levels with mark identification and an output circuit is indicated in diagram at 24. A portion of the output is connected through a feedback network including a first path having an amplifying device, indicated in block at 25, leading to a peak voltage storage device, indicated in block at 27, and a feedback load resistor $R_F$, identified at 28, to the negative polarity terminal 30 of the differential amplifier. The second feedback path, which includes a second feedback resistor $R_2$, identified at 32, is connected directly between the output and negative input terminals 22, 30, respectively, of the differential amplifier with a third resistor $R_1$, identified at 35, being connected to the negative input terminal and a ground connection 36.

In the field of contrast measurement, contrast is identified as equal to the current ratio from the light sensitive device under the presence of a mark compared with the current sensed when only the paper or background of the medium read is present, that is without a mark. Thus, Contrast $= (I\ (\text{mark})/I\ (\text{paper}))$ or $= (I_M/I_p)$ The improved photosense amplifier uses the logarithmic characteristics of a forward voltage-current relationship of the silicon diode to measure contrast ratios from the sensor in the following manner.

The ideal PN diode follows the relationship $$I=I_s\left[\text{Exp}\left(\frac{qv}{KT}\right)-1\right]$$

where $I$ = current through junction,
$I_s$ = saturation current
$q$ = electronic charge,
$v$ = voltage across junction,
$K$ = Boltzmand's constant, and
$T$ = absolute temperature.

The silicon diode by itself does not follow the voltage-current relationship of the ideal PN diode. For example, at very low current levels, the recombination current due to traps near the center of the band gap alters the ideal diode characteristics. This recombination current varies with voltage as $$(I/I_S) \cong_{Exp} qV/2KT)$$

Two phenomena exist in the high current region of operation. When the minority carrier density becomes comparable to the majority carrier density, the current will follow the relationship $$I\text{Exp}(qV/2KT)$$

Figure 2:
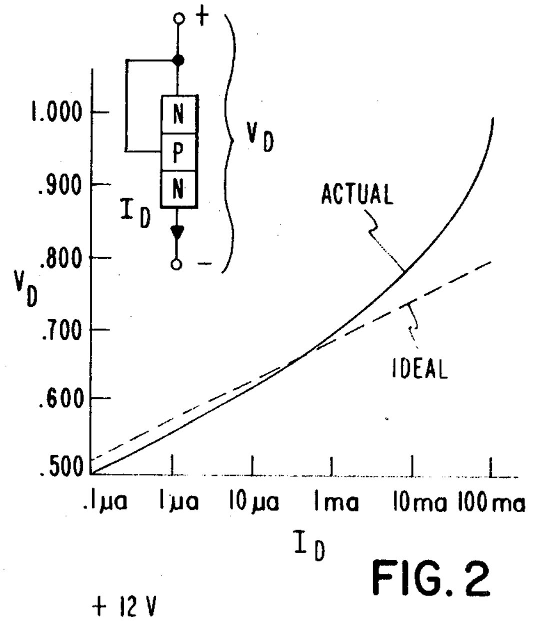
FIG. 2 is a graph of voltage versus current for a silicon diode used for current ratio measurement in the improved amplifying circuit.

This region may be further modified by bulk semiconductor resistance on either side of the PN junction. If this is true, the incremental current will be equal to $$\Delta I=(\Delta V/R_{eff})$$

where $R_{eff}$ is not linear resistance, but the sum of the bulk resistance on each side of the PN junction. Between the high injection region and the low current recombination region there is an operating range where the current in the PN diode closely follows the ideal diode equation. Thus, for example, the graph of FIG. 2 shows the current voltage relationships in this region over second several decades of current. In the operating region where the ideal diode equation describes the V–I relationship, the silicon diode may be used for current ratio measurement. By manipulating equation 1, it can be shown that when the current through the diode is changed from $I_1$ to $I_2$, the voltage change is $$\Delta V=(KT/q)\ 1_n(I_2/I_1)$$

Thus the diode is considered herein as a voltage reference device with logarithmic characteristics whose voltage change will be controlled by the photocell response.

The magnitude of the voltage at a given current will vary from device to device because the saturation current is dependent upon geometry. However, the voltage change between two current levels is consistent from device to device. Thus, the silicon transistor, connected as a PN diode as shown in FIG. 1, will provide a V–I relationship in the area of desired measurement approaching the characteristics of an ideal diode with logarithmic output to voltage change.

In the system, as shown in the block diagram, an arrangement is provided for measuring the ratio of the output of the light sensitive device with a change in light level. Thus, $I_P$ represents the light level output of the light sensitive device in the absence of a mark and $I_M$ represents the output in the presence of a mark, that is some lower light level representing a reflective level from a mark in an optical mark reader. A voltage change will be produced which will be the function of current ratios only and independent of current magnitude. Thus, the network formed by the light sensitive device and the PN diode will provide a voltage output due to change in current in the light sensitive device which will be connected to or represented as input on the plus terminal 21 of the differential amplifier. When this input signal equals $I_P$ or the higher voltage and hence higher current, the output voltage of the differential amplifier will be forced positive and the peak storage circuit will charge to a value sufficient to force the voltage out or present at the contrast output conductor 24 to zero be feeding a voltage back through $R_F$ or resistor 28 to the amplifier input or creating a change at the negative polarity terminal 30. When the input current drops to $I_M$, that is with the presence of a mark, the change in voltage out is $$\Delta V_{\text{out}}=\left(1+\frac{R_2}{R_1||R_F}\right)\Delta V_{\text{D}}$$

$$\Delta V_{\text{D}}=\frac{KT}{q}1_n\frac{I_{\text{M}}}{I_{\text{P}}}$$

so $$\Delta V_{\text{out}}=\left(\frac{KT}{q}1_n\frac{I_{\text{M}}}{I_{\text{P}}}\right)\times\left(1+\frac{R_2}{R_1||R_{\text{F}}}\right)$$

Since most of these terms are constant, the equation can be expressed $$\Delta V_{out}=\text{Constant}\ x1_n\ (I_M/I_P)$$

where T is the only deviation therefrom. The percentage change in $V_{out}$ per degree centigrade is $$\frac{\frac{\Delta V_{\text{out}}}{\Delta T_{\text{out}}}}{V_{\text{out}}}\times 100=\frac{1}{T}\%/C^\circ$$

at room temperature this is approximately 0.3 percent/C.° such that within practical scope of measurement and response, this deviation is of no significance.

Figure 3:
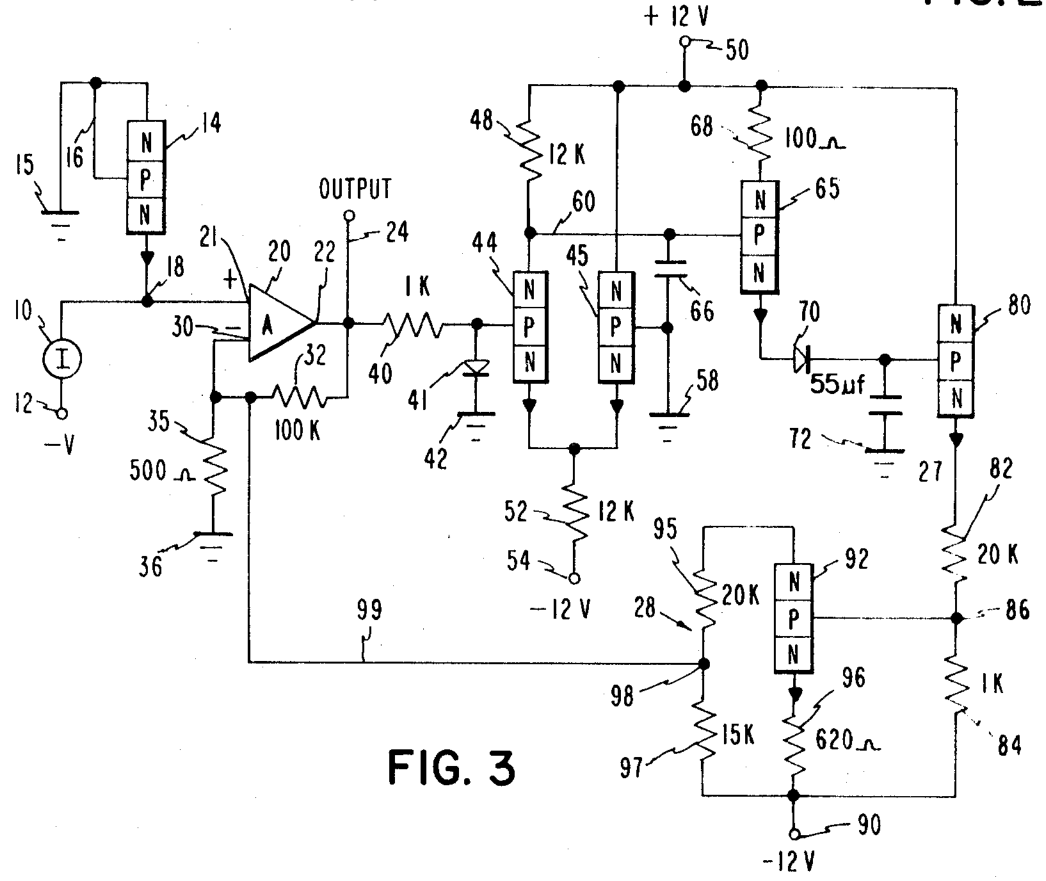
FIG. 3 is a schematic circuit diagram of the improved amplifying circuit of FIG. 1.

FIG. 3 shows a schematic circuit diagram for the improved current ratio amplifier in which the differential amplifier 20 is again shown in block form since it may vary in form and its details may be eliminated for simplicity. Thus, the light sensitive device 10 and the photodevice sensor or PN diode 14 are connected in series relationship from a DC negative source 12 to ground connection 15 with the tap 18 therebetween providing the current output signal to the input terminal 21 of the amplifier. The output terminal 22 includes the first feedback path through resistor 32 and identified as $R_2$ in the block diagram to the second or opposite polarity input terminal 30 of the amplifier 20. The output of the amplifier is taken at the output terminal, as evidenced by the conductor 24, and the feedback path includes a voltage limiting resistor 40 leading to a voltage comparator defined by a pair of matched silicon transistors, indicated generally at 44 and 45. The input path is grounded through a diode 41 to ground 42, and the transistors 44, 45 are connected in a conventional differential amplifier circuit. Thus, the transistor 44 has its collector connected through a bias resistor 48 to a B+ power supply, indicated at 50, with its emitter connected through a bias resistor 52 to a negative power supply terminal, indicated at 54. Transistor 45 of the pair has its collector directly connected to the B+ power supply with its emitter connected to the bias resistor 52 and the B– power supply 54. The base of the transistor 45 is connected to a ground connection 58 and an output circuit is taken through the conductor 60 common to the collector of the transistor 44 and leading to a current gain transistor 65 to be connected at its base. A capacitor 66 connects this input circuit to ground for stability purposes. The amplifier or current gain transistor 65 has its collector connected through a limiting resistor 68 to the B+ power and the emitter of this transistor is connected through a diode 70 to one side of the voltage storage condenser 27, the opposite side of which is grounded as at 72. The diode 70 insures that no back bias will be applied to the transistor 65, which functions to amplify the current gain of the comparator and control the charge on the condenser 27. A buffer amplifier formed by a transistor 80 has its collector connected to the B+ supply and its emitter connected to a voltage shifting network formed by resistors 82, 84 in series connection with the resistor 84 being connected at its opposite extremity to a B− power supply 90. The midpoint of the voltage shifting network, as indicated at 86, is connected to the base of a current control transistor 92 whose collector extremity is connected to a resistor 95 with its emitter connected to a bias resistor 96 and the B− power supply 90. A fixed resistor 97 is also connected to the B− power supply 90 at one extremity and to a junction point 98 common with one extremity of the resistor 95 with a conductor 99 leading therefrom and to the input terminal 30 of the differential amplifier. The voltage dividing or shifting network formed by resistors 82, 84 and the current control transistor 92 control the current flow through the resistor 95. These units in turn are controlled by the discharge of the condenser 27 and form with the fixed resistor 97, the resistor indicated at 28 or $R_F$ in the block diagram in FIG. 1. In effect, a portion of this resistor is variable and another portion is fixed so that current flow through the resistor 95 and hence voltage at the input terminal 30 is adjusted from the B− supply for balance of the amplifier under certain conditions of operation and control of the amount of feedback in this feedback path.

In the operation of the improved current ratio amplifier, and under the conditions of no mark or characteristic to be read by the light sensitive device, a generally white level background is sensed to provide a maximum voltage for peak light level from the document (not shown). The PN diode or the modified silicon transistor will conduct a maximum amount of current under these conditions and the voltage at the input or positive polarity terminal 21 of the differential amplifier will be least positive so that the output of the same will be least positive. The transistors 44, 45 forming the differential amplifier or the comparator will have a transistor 44 conducting a lesser amount of current because of this output and hence the transistor 45 will conduct more. The output of this differential amplifier from the collector of the transistor 44 will reduce in voltage increasing the current flow through the transistor 65 which is normally back biased to off. This will cause the condenser 27 to a peak storage level and at the same time control the conduction of a buffer amplifier or transistor 80 to change the voltage on the voltage shifting network formed by resistors 82, 84 and vary current flow from the amplifier through the resistor 95 as controlled by the operation of the transistor 92. The combined effect of current flow through the transistor 97 and 95 will provide a voltage change at the negative input terminal 30 so that no potential difference will exist between positive and negative input terminals of the differential amplifier causing the output of the amplifier to go to approximately zero reference volts within the tolerances of the feedback circuit.

With the presence of a mark, the current change in the light sensitive device can cause an appropriate change in current flow through the diode 14 causing it to become more positive. The effect on the input of the amplifier is to cause it to go positive with respect to its previous level. This will cause the transistor 44 in the comparator to conduct more and the balance or opposite transistor 45 whose base is connected to ground to conduct less. The resultant output is a decrease in the voltage level at the base of the transistor 65 controlling current gain therethrough and through the condenser. Since this transistor is back biased to off, current flow will decrease and the capacitor will store the peak level charge prior to transistor 65 turning off. The buffer amplifier under the presence of this signal will conduct with the discharge of the condenser but the buffer amplifier will delay feedback to the differential so that the increased input thereto as represented by the increase in voltage at the output terminal will be read as a blip or peak voltage as an indication of the mark before the feedback circuit brings the amplifier back to zero output.

Figure 4A:
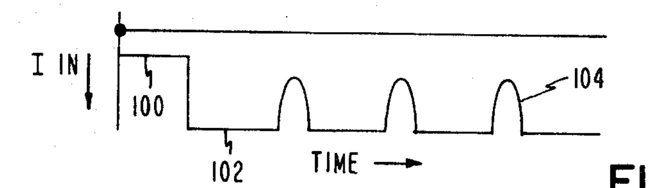
FIGS. 4*a* and 4*b* are graphs of typical input wave forms and corresponding voltage output wave forms for the amplifier of the improved amplifying circuit.
Figure 4B:
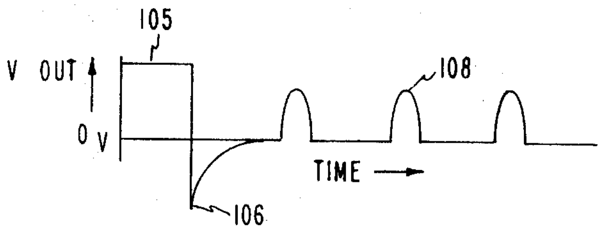

Referring to FIG. 4, it will be seen that the graph 4*a* represents the input current wave form to the differential amplifier with the area on the curve, indicated at 100, representing the dark level between documents. The rise or increased negative current portion of the curve or graph, indicated at 102, is the maximum light level produced by the presence of a highly reflective document without the presence of a mark. The individual marks are represented by rising or more positive current pulses 104 which indicate the change in current output of the input network to the amplifier. Graph 4*b* discloses schematically the output voltage wave form for the amplifier 20 corresponding to the changes in current input shown in graph 4*a*. A level on the graph, indicated at 105, represents the voltage output and corresponds with the dark level between documents. The peak 106 on the graph represents the leading edge of the document or maximum height level with the effect of a condenser charging and producing the feedback to the amplifier to bring it to zero reference for a stabilization period. Thereafter, the positive voltage output pulses or blips 108 correspond with the marks read and the current changes at the input side of the amplifier. The capacitor in the feedback circuit will delay balance level causing the amplifier to see and amplify only the incremental swing of voltage which appears across the photodevice sensor 14.

DESCRIPTION OF THE ALTERNATE EMBODIMENT

Figure 5:
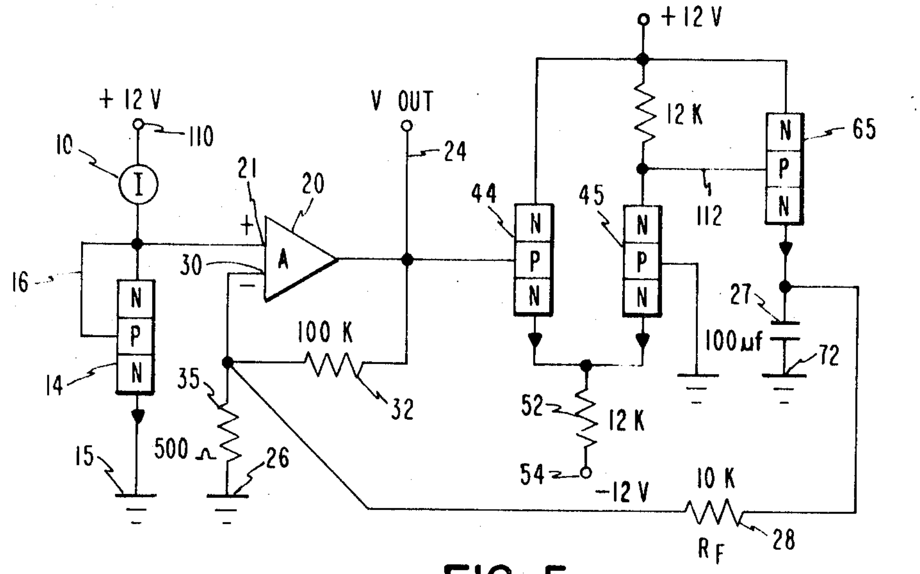
FIG. 5 is a schematic circuit diagram of another embodiment of the improved logarithmic sense amplifier.

The embodiment shown in FIG. 5 employs substantially the same amplifying circuit with a change in bias or source connection across the input measurement network formed by the light sensitive device 10 and diode 14. Thus, as will be seen in FIG. 5, the light sensitive device has connected thereto a B+ power supply, indicated at 110, with the light sensitive device 10 being connected at one side thereto and through the modified diode 14 or voltage reference device having the logarithmic output characteristic and leading to the ground connection 15. The remaining portion of the circuit is substantially unchanged. Thus, the output of amplifier 20 leading to the voltage output or comparison tap 24 includes the separate feedback path as previously defined. The feedback path is through the comparator formed by transistors 44, 45 in a differential amplifier connection is slightly modified in that the transistor 44 supplies the reference and the transistor 45 has the output conductor 112 taken therefrom to the base of the current gain transistor 65 controlling the charging of the condenser. The condenser, shown at 27, is grounded and discharged through the fixed resistor 28 to the input tap 30 of the differential amplifier. The fixed feedback resistor 32 between the input and output of the amplifier and the bias resistor 35 connecting the negative input terminal 30 to ground, remain unchanged.

Figure 6A:
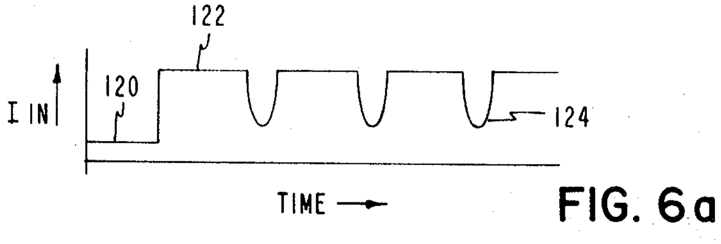
FIGS. 6*a* and 6*b* are graphs of typical input current wave forms and corresponding voltage output wave forms of the amplifier embodiment shown in FIG. 5.
Figure 6B:
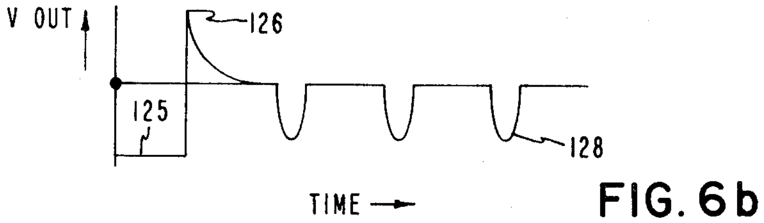

In the graph 6*a* of FIG. 6, the current input from the sensing network is shown in which a substantially zero input current is fed to the amplifier at the dark level between documents. This is indicated at the portion of the graph designated at 120. Maximum light level produces a maximum input current, indicated at 122, with a decrease in input current at the mark readings 124. The corresponding output from the amplifier, as shown in graph 6*b*, is evidenced by the low level output 125 or negative output corresponding with the dark level between documents. The peak voltage output is evidenced at the start of the charge of the condensers, indicated at 120. The mark indications or negative voltage blips or dips 128 are evidenced to correspond with the current input changes of the momentary type in the sensing network as controlled by the change in voltage level of the photodevice sensor 14.

In this embodiment, the light sensitive device 10 conducting at a maximum level with the presence of no mark on a document, that is peak light level to the same, will cause the photodevice sensor or diode 14 to conduct at a maximum amount of current. The voltage at the input terminal 21 of the differential amplifier is more positive and the output tends to be most positive, as indicated by the graph 6*a*. The comparator or differential amplifier formed by the diode 44, 45 will respond to the output with the transistor 44 conducting more current and the transistor 45 which is referenced ground, conducting less current under these conditions. In this embodiment, the collector of the transistor 45 which is connected through the base of the current gain transistor 65 will reach a higher voltage level causing a greater current flow through the transistor 65 and a charging of the capacitor 27. The emitter voltage of this current gain transistor is fed back through the feedback resistor 28 to balance a negative input terminal 30 of the differential amplifier so that no potential difference occurs between the positive and negative input terminals to make voltage out at the terminal 24 approximately zero reference voltage within the tolerances of the feedback circuit elements. The presence of a mark will reduce the light seen by the light sensitive device and hence the conduction of the diode 14 so that it will become less positive. The output of the amplifier which receives this reduced positive voltage tends to reduce in voltage or go negative which will decrease the conduction of the transistor 44 and increase the conduction of the transistor 45. The current gain in transistor 65 is backed bias to off under these conditions and the capacitor stores the peak level it has seen prior to the transistor 65 being biased off and thus the feedback at the negative terminal 30 in the differential amplifier stays substantially the same long enough to permit the differential amplifier to show the increased voltage output or peak evidencing the mark. With the proper selection of amplifier, that is its gain constant and the values of the resistances and amplification in the output circuit, the incremental voltage change which, due to the logarithmic characteristics in the measuring circuit, provides an increased current output and can be reflected in a significantly higher output voltage suitable for compatible equipment used in contrast measuring systems.

I claim:

1. A logarithmic sense amplifier circuit comprising, an amplifier having first and second inputs and an output, a device having a logarithmic voltage characteristic over a current conducting range and conducting current varying between minimum and maximum levels and connected to said first input of said amplifier, and comparator means having an input connected to the output of said amplifier and a second input connected to a predetermined voltage reference and having an output connected to said second input of said amplifier to feed back a current thereto to balance the output of said amplifier to substantially the voltage level of said predetermined voltage reference when the current applied to said first input of said amplifier from said device is at said maximum level.

2. The logarithmic sense amplifier of claim 1 wherein said comparator means is a second amplifier having a first input connected to the output of said amplifier and having a second input connected to a reference voltage, to balance the output voltage of said amplifier to be substantially equal to the voltage of said reference voltage when the current applied to said first input of said amplifier from said device is a maximum.

3. A photosense amplifying circuit comprising, a measuring circuit including a light sensitive device and a voltage reference device having a logarithmic characteristic connected together into a source of power and having an output circuit adapted to have a logarithmic voltage signal controlled by the current change in the light sensitive device, amplifying means having a pair of input circuits one of which is connected to the output circuit of said measuring circuit, the improvement comprising a feedback network having a plurality of feedback paths one of which includes a differential amplifier having a first input connected to a voltage reference and having a second input connected to the input of said feedback network, and a voltage storage means connected between the output of said differential amplifier and the output of said feedback network, said feedback network being connected between the output circuit of the amplifying means and said other input of the input circuits to the amplifying means and being adapted to feedback a voltage signal to the other of said input circuits of the amplifying means to balance the voltage level at said one input circuit when the current in said light sensitive device is at a maximum.

4. The photosense amplifying circuit of claim 3 in which the plurality of branches of the feedback network include fixed and variable resistance means with the variable resistance means being adjustably controlled by the voltage stored in the voltage storing means to balance the input voltage level of said amplifying means when the current in said light sensitive device is at a maximum.

5. The photosense amplifying circuit of claim 4 in which the voltage reference device simulates an ideal diode and in which the gain of the amplifying means and the values of the fixed and variable resistance means in the feedback network are adjusted such that the output voltage of the amplifying means is proportional to the change in voltage of the voltage reference device with momentary changes in light intensity impressed on the light sensitive device.

6. The photosense amplifying circuit of claim 5 in which the amplifying means is a differential amplifier and the output therefrom is proportional to the change in the logarithm of the current of the light sensitive device with variation in light impressed on the light sensitive device.

7. A logarithmic sense amplifier circuit comprising in combination, a measuring circuit including a voltage reference device having a logarithmic characteristic with an output tap connected to a condition responsive means having variable current output characteristics to provide a voltage output signal at said output tap of said voltage reference device proportional to the logarithm of the condition sensed by the condition responsive means, amplifying means having an input circuit and an output circuit, circuit means connecting the output tap of said voltage reference device of the measuring circuit to the input circuit of said amplifying means, the improvement comprising a voltage feedback circuit including a differential amplifier having a first input connected to a voltage reference and having a second input connected to said output circuit of said amplifying means, and peak storage means connected between the output of said differential amplifier and the input circuit of the amplifying means to feedback a degenerative signal such that the amplifying means output circuit provides an output signal proportional to the logarithm of the ratio of the maximum current signal through said voltage reference device and a particular current signal therethrough at any instant of time.

8. The logarithmic sense amplifier circuit of claim 7 in which the voltage reference device of the measuring circuit and the condition responsive means are adapted to be serially connected in the measuring circuit and to a source of power with the output tap connected intermediate to the condition responsive means and the voltage reference device.

9. The logarithmic sense amplifier circuit of claim 7 in which the voltage reference device is a logarithmic diode device.

10. The logarithmic sense amplifier circuit of claim 7 wherein said peak storage means of the feedback circuit is a capacitor.

11. The logarithmic sense amplifier circuit of claim 7 in which the amplifying means is a differential amplifier having a pair of opposite polarity input taps forming the input circuit with the output tap of the measuring circuit being connected to one of the input taps and the feedback circuit connected to the other of the input taps of said amplifying means.

12. The logarithmic sense amplifier circuit of claim 7 in which the voltage reference device is a three element semiconductor device shorted between two of the three elements and connected to operate as a diode.